Aug. 4, 1942. J. H. WEATHERFORD 2,291,852
SHAVING APPARATUS
Filed Feb. 21, 1940
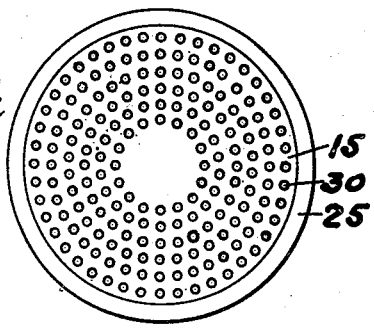
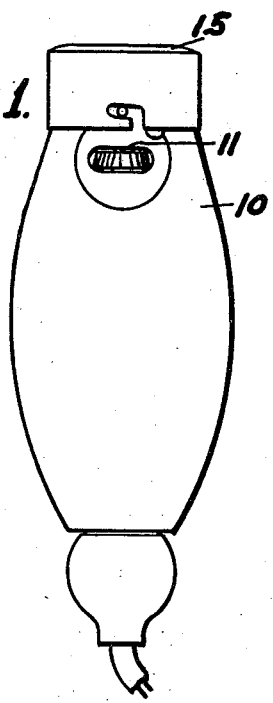
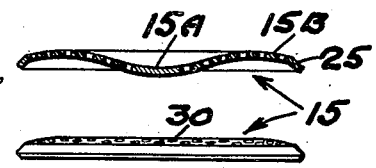
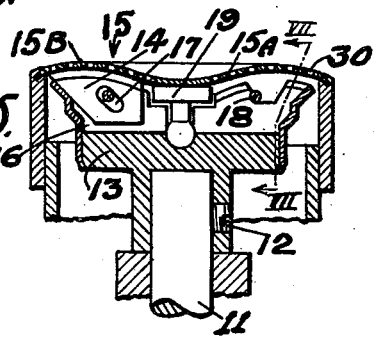
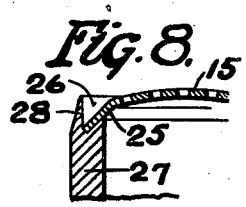
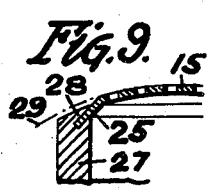
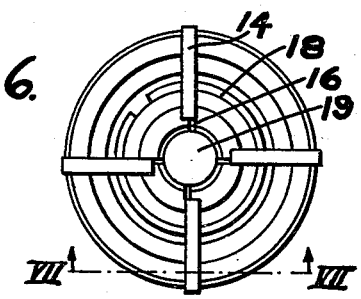
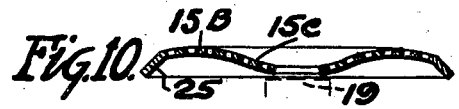
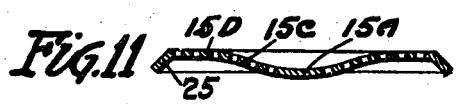
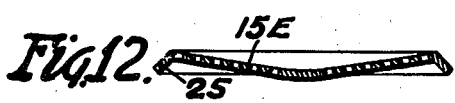
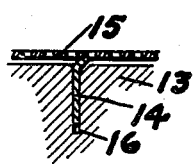
INVENTOR
Joseph H. Weatherford Patented Aug. 4, 1942

2,291,852

UNITED STATES PATENT OFFICE 2,291,852

SHAVING APPARATUS

Joseph H. Weatherford, Memphis, Tenn.

Application February 21, 1940, Serial No. 320,093

5 Claims. (Cl. 30—43)

This invention relates to motor driven shaving devices, sometimes known as dry shavers, which use a thin perforated skin-contacting plate, and in which a rotary cutter in contact with the back of this plate is turned about an axis at right angles to the plate.

It especially relates to the shaping of this plate and the attachment of the plate to the head portion of the device.

One type of these devices makes use of a perforated dome-shaped plate which is quite thin and because of its thinness necessarily somewhat flexible. This type has a shaft co-axial with the dome-shaped plate which is driven at a high rate of speed. The shaft carries a head having blades or cutters which intimately contact the underside of the plate and shear off such hairs as project through the plate openings when the apertured plate is brought in contact with the face. The center portion of the plate and the zone immediately therearound are so close to the axis of the shaft that there is insufficient speed of movement to do effectual cutting and the blades or cutters cover, and operate, only in an annular cutting zone spaced from the center. Because of the thinness of the plate the center is supported to substantially prevent appreciable deflection.

The resulting structure when pressed against the face with the shaft substantially normal to the face, is effective for cutting over such portions of the face as may be pressed into conformity with the shape of the plate and which so pressed, contact the plate in the annular cutting zone. The face contour however is largely convex and since the plate contour is also convex, intimate contact of the cutting zone of the plate surface, with the face is substantially prevented a very large proportion of the time, and contact can only be accomplished by a rocking motion which brings a minor portion only of the cutting zone into operative position. In addition to this it is ordinarily customary to secure the plate to the holder structure by turning a bead over the peripheral edge of the plate and here a local obstruction is set up which obstructs that intimacy of contact necessary to secure satisfactory results.

The primary object of the present invention is to so shape the contour of the plate that a cutting belt or zone is established which may be brought into annular contact with the face whether the surface of the face be there convex or concave.

A further object is to so secure the outer edge of the plate that no projecting rib is established to interfere with full contact of the edge portions of the plate and the face surface.

The first of these objects is primarily accomplished by depressing or concaving the center portion of the plate and relatively convexing the cross section of the annular perforated belt therearound so that annular contact may be made with a convex surface portion of the face.

The second of the objects is accomplished by bending the peripheral edge of the plate backwards away from the contacting surface thereof and securing this rearwardly bent portion of the plate to the holder.

Further means by which these and other objects may be accomplished will be understood from the accompanying specification on reference to the accompanying drawing, in which:

Fig. 1 is an elevation of a dry shaving device embodying the present device.

Fig. 2 is a sectional elevation of the preferred form of the skin-contacting shear plate.

Fig. 3 is a side elevation of the plate.

Fig. 4 is a plan view of the plate.

Fig. 5 is a cross sectional elevation of the plate and holder and a form of cutting head cooperating therewith.

Fig. 6 is a plan view of the cutting head, and Fig. 7 a fragmentary section taken as on the line VII—VII of Figs. 5 and 6 showing cross section of a blade and the groove therefor.

Figs. 8 and 9 are fragmentary sectional details much enlarged showing the edge of the plate and manner of attachment to holder.

Figs. 10, 11 and 12 are sections showing modifications of plate cross section.

Referring now to the drawing in which the various parts are indicated by numerals:

10 is a handle containing an electric motor of usual type having a shaft 11. Mounted on the shaft 11 and secured thereto as by a screw 12 is a head 13 which carries cutting blades 14 adapted to be carried around by the head in cutting or shearing contact with a perforated, skin-contacting shear plate 15 which is the primary subject of the present invention. The blades 14 preferably are mounted in slots 16 in the head and may be provided each with an inclined slot 17 and retained in the head slots 16 as by a split ring 18, the carrying and retaining structure permitting movement of the blades into plate contact by centrifugal force.

19 is a post axially concentric with the shaft 11 and turnably mounted in the head 13, which post closely underlies the center of the plate 15, and preferably clears such plate, if at all, only sufficiently to insure freedom from plate pressure except when the plate may be forced thereagainst in use.

The plate 15 is preferably circular and preferably has an annular peripheral edge or flange 25 extending rearwardly and outwardly (Figs. 8 and 9) which is engaged in a groove 26 in the end of a cylindrical holder 27 and is secured thereto by beading over the outer side wall 28 of the groove, Figs. 8 and 9 respectively showing the successive steps. The angle and extent of the flange 25 are such as to cause the securing bead 28 to lie flush with or below the contour of the plate 15, as shown in Fig. 9 by the dash line extension 29 of the surface.

In its preferred form, shown in Figs. 2 and 5, the plate has an inwardly concaved center portion 15—A, and an outwardly convexed belt portion 15—B extending annularly therearound, said belt portion in cross section being substantially symmetrical about the median axis parallel to the shaft axis. This belt portion of the plate is provided with a great number of hair receiving apertures 30 which may be of any desired shape, but which preferably are round as shown. The concave center portion may also be apertured but preferably is left blank.

Figs. 10, 11 and 12 show alternate or modified cross sections of the plate. Fig. 10 omits the central portion of the plate, but preserves the apertured annular convex belt portion 15—B and emphasizes the fact that the inner portion 15—C of the belt converges rearwardly and toward the shaft in substantially the same way that the outer portion of the belt diverges rearwardly. Should the central portion be omitted it is preferable that the belt portion extend sufficiently inward to contact and be supported at its inner edge by the post 19.

Fig. 11 is centrally substantially similar to Fig. 2, having a concave center portion 15—A and an apertured belt portion therearound, preferably somewhat more than half 15—C of the inner portion of the belt convexing outwardly from the center portion, the outer portion of the belt however being substantially a disc 15—D extending tangentially outward from the apex of the convex portion 15—C.

Fig. 12 shows a still further modification in which the plate 15—E is concave.

The plate is of extreme thinness, being preferably only a few thousandths of an inch thick and the holes are usually .025 to .035 inch in diameter. With a plate of this thinness there is obviously great tendency to deflect and distort, which is obviously undesirable, under pressure, such deflection being obviously greatest in the center unless there supported against substantial deviation. Concaving the central portion of the plate however tends to reduce or even obviate central face contacts and pressures and transfers substantially all face contacts to the sharply arched ring adjacent the rigid holder portion, and here the support afforded by the holder is supplemented by the central support. This central support being free to turn relatively to the shaft may be made, and preferably is made, as large in diameter as possible without contact with the blades and the span between supports is thereby substantially reduced. Under use conditions therefore the head shape substantially confines face contacts to the ridge and effectively stiffens the plate against buckling under service use.

I claim:

1. A shaving device, employing a thin apertured skin-contacting shear plate and cutter means rotated in shearing engagement with the underside of said plate on an axis normal to said plate, said plate having surfaces of revolution about said axis and gently undulating in diametral cross section, the axial center of said plate being depressed, whereby to create a shallow saucer-like portion adapted for said skin contact with convex portions of the face.

2. In a shaving device the combination, with a thin apertured skin-contacting shear plate, of a complementary inner cutter engaging the under surface of said plate, and means for rotating said cutter about an axis normal to said plate, said plate having surfaces of revolution about said axis, and in diametral cross section, being of shallow undulatory cross section with a single, axially centered, depressed undulation, and single undulations respectively continuing oppositely therefrom, said cutter engagement including shearing contact with the flatly sloping annular zone of said plate immediately surrounding said center and said zone being adapted for shaving engagement with convexed portions of the face, and to promote stable positioning with reference to said face.

3. A shaving device which includes a thin apertured skin-contacting plate having a surface of revolution about a central axis normal to said plate, diametral cross sections of said plate being of shallow undulating form, centrally depressed and gently swelling oppositely therefrom, establishing a plate having a flatly concaved central zone; and cutter means rotatable about said axis in contact with the underside of said plate whereby to establish shearing surfaces including a shearing zone adapted for shaving engagement with convexed portions of the face and stable positioning relative thereto.

4. A shaving device which includes a thin, apertured, circular shear plate, cutter means adapted for shearing engagement with the under surface of said plate, and means for rotating said cutter means in cutting engagement with said plate about an axis substantially normal to said plate; said plate being gently undulatory in diametral cross section, said undulations being disposed to establish a depressed central portion, and concentrically therearound, a shallow annular swell portion having interblending upwardly sloping and outwardly extending areas, and particularly characterized by the establishment of cutting areas adapted respectively for engagement with convex and flat face surfaces, and for smoothly shifting therebetween.

5. A shaving device employing a thin apertured skin-contacting shear plate and cutter means rotated on an axis normal to said plate and in shearing contact with the underside thereof; in which said plate is a disc concentric with said axis, having adjacent its periphery a concentric swell portion rising a minor amount only, relatively to its width, above the level of the edge and center portions of said disc, said disc being of gently undulatory diametral cross section, and the apex of said swell portion being smoothly convexed, said perforations being disposed in a circular zone concentric with said axis along the apex and slopes of said swell, whereby to provide interblending annular shearing areas adapted for shearing engagement respectively with convex as well as concave and substantially flat face surfaces and for shifting smoothly from one to the other thereof, while promoting stable positioning of said device in shearing engagement with said surfaces.

JOSEPH H. WEATHERFORD.